Feb. 9, 1932.  F. G. THWAITS  1,844,530
SEPARABLE COMPARTMENT TANK
Filed Oct. 24, 1929  2 Sheets-Sheet 1
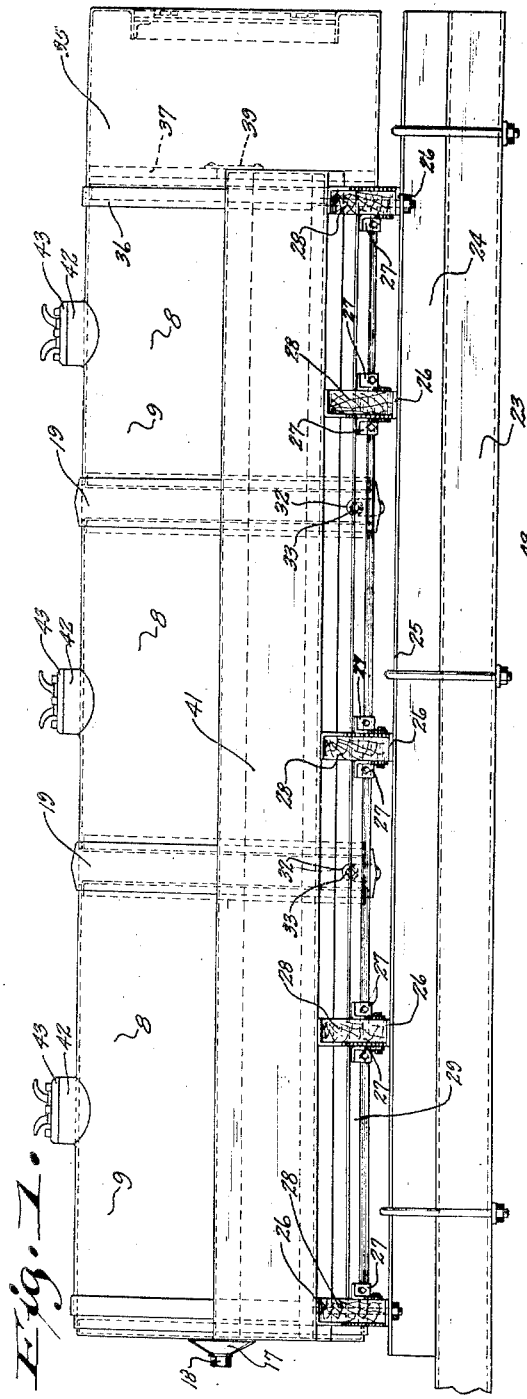
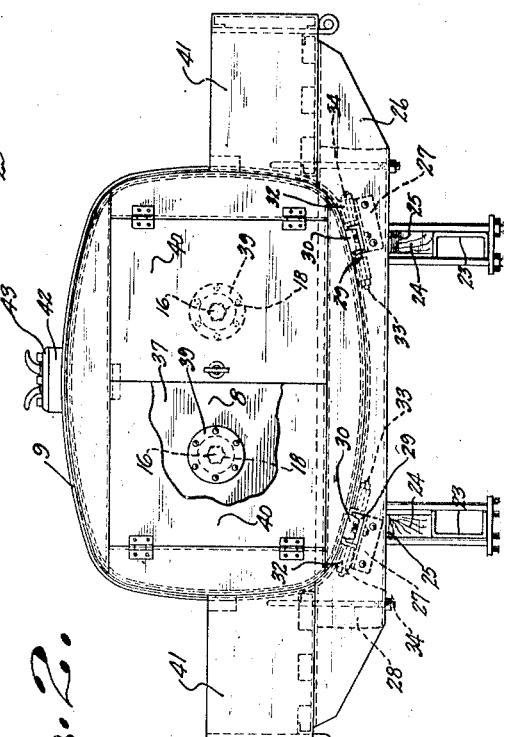
INVENTOR.
Frederick G. Thwaits,
BY
Morsell, Keeney & Morsell
ATTORNEYS

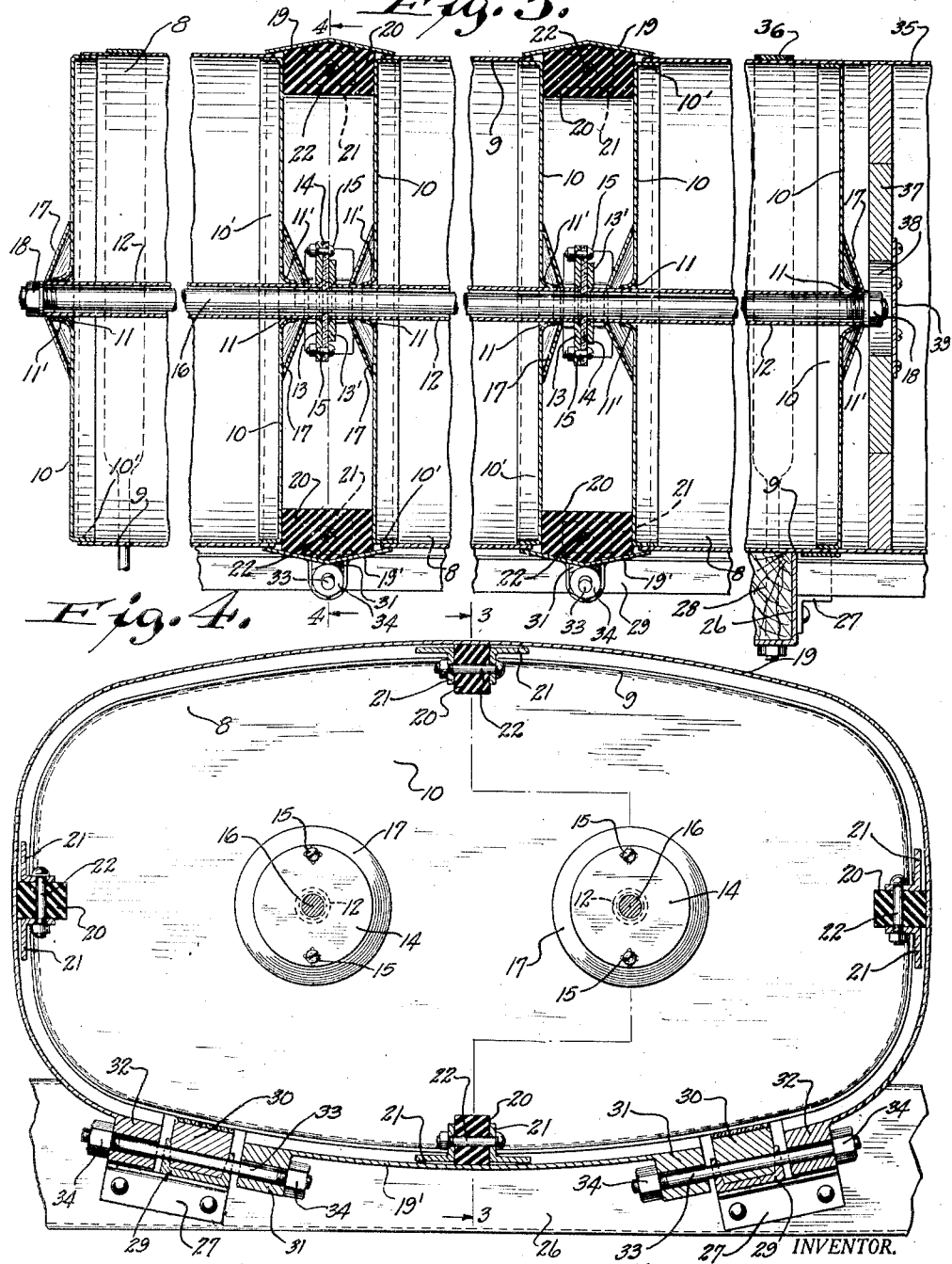

Patented Feb. 9, 1932

1,844,530

UNITED STATES PATENT OFFICE

FREDERICK G. THWAITS, OF WAUWATOSA, WISCONSIN, ASSIGNOR TO THE HEIL CO., OF MILWAUKEE, WISCONSIN, A CORPORATION OF WISCONSIN

SEPARABLE COMPARTMENT TANK

Application filed October 24, 1929. Serial No. 402,262. REISSUED

This invention relates to improvements in separable compartment tanks.

Heretofore, compartmental tanks for mounting on truck chassis and vehicles and for other uses have been formed integral with the compartments of the tank being defined by inner partitions within the unitary tank. Necessarily tanks so constructed had to be made according to standard lengths and for each chassis or vehicle frame of a different length a tank of a different length was required. Obviously, a tank built to a certain specified length could not thereafter be varied from its original length to adapt it for a mounting other than that originally planned.

It is, therefore, one of the objects of the present invention to overcome the above objections or limits of use of tanks of the class described now in common use by providing a separable compartment tank, each tank being formed of several individual compartments or units which units are adapted to be detachably connected together end to end to form a compartment tank of a desired, variable length and also variable as to the number of compartments in the tank.

A further object of the invention is to provide in a separable compartment tank, novel means for detachably connecting together a plurality of compartment units to form the tank proper, said means being arranged and designed so as to prevent said compartment units from rattling, preventing undue play and torsional movement between the compartment units, but permitting some flexibility of the tank, and preventing leakage of the compartment units.

A further object of the invention is to provide in a separable compartment tank, novel and simple means for securing the tank to a sub-frame.

A further object of the invention is to provide a separable compartment tank which is of very simple construction, is strong and durable, and is well adapted for the purposes described.

With the above and other objects in view the invention consists of the improved separable compartment tank, and its parts and combinations as set forth in the claims, and all equivalents thereof.

In the accompanying drawings in which the same reference characters indicate the same parts in all of the views:

Fig. 1 is a side view of the improved separable compartment tank shown mounted on a sub-frame which in turn is mounted on a vehicle chassis;

Fig. 2 is a rear end view thereof with part broken away;

Fig. 3 is an enlarged, fragmentary longitudinal vertical sectional view of the tank taken on the line 3—3 of Fig. 4; and Fig. 4 is a cross-sectional view taken on line 4—4 of Fig. 3.

Referring now more particularly to the drawings, it will appear that the improved separable compartment tank is formed of two or more compartment units 8 secured together endwise. Each compartment unit 8 comprises a sheet of metal 9 bent into substantially oval form with its meeting edges secured together, and the ends are closed by means of drums or covers 10 whose flanged edge portions 10' are welded to the edge portions of the sheet 9.

The end drums or covers 10 of each compartment unit are formed with two or more spaced-apart openings 11 and the metal surrounding each opening is forced outwardly to form a boss 11'. Two or more tubular members 12 extend longitudinally through the interior of each compartment unit, and each tubular member projects at its end portions through a pair of longitudinally opposed openings 11 and bosses 11'. The abutting end portions of aligned tubular members of compartment units, outwardly a short distance of each boss 11', carry flanges 13 and 13' and interposed between pairs of flanges 13 and 13' are filler discs 14 of rubber or fibrous material, which discs are held to adjacent flanges 13 by bolts 15.

The arrangement of the tubular members 12 described for each compartment unit are instrumentalities effective in arranging the joining of several compartment units when a multi-compartment tank is to be formed. When this is the case and the several units are disposed end to end, as described, a positive joining of all of the units if effected by means of elongated rods 16 which are extended through the several series of aligned tubular members 12. The extreme end portions of the rods 16 are threaded and extend outwardly of outer conical bosses 17 on the end drums 10. Nuts 18 on the threaded end portions of the rods 16, when drawn up tightly, cause the various compartment units to be clamped together in endwise relation, and the interposition of the yieldable discs 14 between the pairs of adjacent flanges 13 and 13' will take up stresses and prevent friction and rattling.

As shown in Fig. 3 joints or spaces result between adjacent ends of joined compartment units and said joints are covered by means of circumferential, slightly angular, bands 19. A plurality of yieldable blocks 20, formed of rubber or a similar resilient material, are interposed between the end drums 10 of adjacent units, as shown in Figs. 3 and 4, and said blocks are secured to the bands 19 by means of angle brackets 21. Each block 20 is embraced on opposite sides by a pair of angle brackets with a bolt 22 extending through the block and brackets, and the other flanged portions of the brackets are welded at their points of contact to the inner surface of a band 19.

The chassis of a truck on which the improved separable compartment tank is mounted comprises a pair of spaced longitudinally extending channel or U-bars 23 on the upper flanges of which are secured longitudinally extending beams 24, the upper faces of which are preferably formed with metallic sheets or strips 25. Transverse frame members 26 are mounted spacedly across said beams 24 and embraced within said members 26 are transverse filler beams 28. Secured to a side face of each member 26 and 28 are a pair of laterally spaced-apart angle brackets 27 and the two series of angle brackets 27 on each side of the chassis serve as supports for a pair of longitudinal channel members 29. Laterally spaced-apart rails or wood fillers 30 seat within said channel members 29 and support the tank units thereabove.

As shown clearly in Fig. 4, each circumferential band 19 for a joint between a pair of tank units is in two parts, and the end portions of the lower part 19' thereof are formed with bored bosses 31. Also, the end portions of the major part of said band are formed with similar bored bosses 32. The tank units are then clamped to the sub-frame and the joint bands 19 and 19' are drawn tightly by means of bolts 33 extended through adjacent bosses 31 and 32, a rail 30, and a channel member 29. Both ends of each bolt 33 have threaded thereon nuts 34 which are drawn up tightly for clamping purposes.

In certain embodiments of the invention it is desirable to provide rearwardly of the rearmost tank unit a receptacle compartment, and as shown in Figs. 1 and 2, the metal sheet 35 defining the side walls thereof is merely a continuation of the sheet 9 of the rear-most tank unit. The end portion of the last tank 8 is surrounded by a tie band 36. Within the inner end portion of said compartment is a wall 37 having openings 38 therein covered by removable plates 39 for access to the rods 16 and nuts 18. The closed outer end of said compartment is provided with a pair of hinged doors 40. It should also be observed that longitudinally extending compartments 41 may be formed on each side of the tank and the same are supported by the members 26—28. The upper portion of each tank unit is formed with a centrally located necked opening 42 closed by a removable cover 43 for filling each tank unit.

From the foregoing description it will be seen that in the improved separable compartment tank, the tank proper is formed to a desired length of a plurality of separably joined tank units, which units are connected together and to a sub-frame in a very novel, strong and efficient manner.

What is claimed as the invention is:

1. A fluid tank for vehicles, comprising a pair of independent enclosed tank units, means for detachably connecting said tank units together in slightly spaced apart endwise relation, and common means for covering the joints between adjacent end portions of the tank units and also for detachably mounting the joined tank units on a vehicle.

2. A separable compartment tank for vehicles, comprising a pair of tank units, each unit forming a compartment of the tank proper, and means extending longitudinally of and common to all of said tank units for rigidly, detachably connecting the same in end-wise relation.

3. A separable compartment tank for vehicles including a sub-frame, comprising a plurality of similar tank units, each unit forming a separated compartment of the tank proper, means extending longitudinally through said tank units for rigidly, detachably connecting the same in endwise relation, and means for detachably connecting the joined tank units to a sub-frame.

4. A separate compartment tank for vehicles including a sub-frame, comprising a plurality of similar tank units, each unit forming a separated compartment of the tank proper, means extending longitudinally through said tank units for rigidly, detachably connecting the same in endwise relation, and strap members covering the joints between adjacent tank units and having means for releasably, clampingly engaging a sub-frame for tying the joined tank units thereto.

5. A separable compartment tank for vehicles including a sub-frame, comprising a plurality of similar tank units, each unit forming a compartment of the tank proper, means extending longitudinally through said tank units for detachably connecting the same in endwise relation, resilient members interposed between adjacent ends of adjacent tank units, and strap means for detachably connecting the joined tank units to a sub-frame.

6. A sectional, multi-compartmental tank, comprising a plurality of similarly shaped and proportioned enclosed tank units positionable in desired numbers adjacent one another in endwise relation to attain a given length, and means extending longitudinally through all of said endwise disposed tank units releasably joining the same to form a unitary variable length compartmental tank.

7. A sectional, multi-compartmental, variable length fluid tank for sub-frames, comprising a plurality of enclosed tank units positioned adjacent one another in endwise relation, releasable connecting means extending longitudinally through all of said tank units permitting the disengagement and removal of some or any of the tank units and also permitting the joining thereto of additional tank units, and strap members covering and engaging adjacent end portions of adjacent tank units and arranged for releasable clamping engagement with portions of a sub-frame.

8. A fluid tank for vehicles, comprising a pair of independent enclosed tank units, means extending longitudinally of and common to both of the tank units for detachably connecting said tank units together in slightly spaced-apart endwise relation, and resilient members interposed between the adjacent end portions of said tank units.

9. A fluid tank for vehicles, comprising a pair of independent enclosed tank units, means common to all of said tank units for detachably connecting said tank units together in slightly spaced-apart endwise relation, resilient members interposed between the adjacent end portions of said tank units, and common means for both covering the joints between the ends of said tank units and also for detachably securing the joined tank units on a supporting frame.

In testimony whereof, I affix my signature.

FREDERICK G. THWAITS.